United States Patent [19]

Busch

[11] Patent Number: 5,612,544
[45] Date of Patent: Mar. 18, 1997

[54] MEASURING DEVICE WITH AN INTEGRATED LIGHT SCANNING MEANS WHICH SCANS BOTH ROTATIONS OF A ROTATING BODY AND CODED DATA ASSOCIATED WITH THE ROTATING BODY

[75] Inventor: Dieter Busch, Ismaning, Germany

[73] Assignee: Prüftechnik Dieter Busch AG, Ismaning, Germany

[21] Appl. No.: 468,001

[22] Filed: Jun. 6, 1995

[30] Foreign Application Priority Data

Jun. 13, 1994 [DE] Germany .......................... 44 20 562.7

[51] Int. Cl.⁶ ........................................... G06K 5/00
[52] U.S. Cl. ..................... 250/556; 250/231.17; 235/462
[58] Field of Search ......................... 250/231.17, 231.13, 250/231.18, 566, 556; 235/462, 375, 472; 377/15, 16, 24; 356/373, 375

[56] References Cited

U.S. PATENT DOCUMENTS

| | | | |
|---|---|---|---|
| 4,691,112 | 9/1987 | Wydler | 250/566 |
| 4,772,254 | 9/1988 | Grassl et al. | 494/10 |
| 4,885,707 | 12/1989 | Nichol et al. | 235/375 |
| 5,029,034 | 7/1991 | Weiley | 377/15 |
| 5,059,901 | 10/1991 | Van Voorhis | 250/231.13 |
| 5,065,017 | 11/1991 | Hoech | 250/231.17 |
| 5,471,054 | 11/1995 | Watanabe | 250/231.13 |

FOREIGN PATENT DOCUMENTS

| | | |
|---|---|---|
| 0226886 | 7/1987 | European Pat. Off. . |
| 3524806 | 1/1986 | Germany . |
| 3809454 | 10/1988 | Germany . |
| 2204680 | 11/1988 | United Kingdom . |

*Primary Examiner*—Que Le
*Attorney, Agent, or Firm*—Rothwell, Figg, Ernst & Kurz, P.C.

[57] ABSTRACT

A measuring device with an integrated light beam scanning means for detecting the number of revolutions of a rotating body, contrast-coded data (bar codes) being capable of detection by means of the light beam scanning means. The measuring device includes a selecting means to select the mode of operation consisting of measuring the number of revolutions or detecting data. An analyzing means analyzes signals outputted by the scanning means (1) and automatically selects one of the modes of operation consisting of measuring the number of revolutions and detecting data in dependence on the result of the analysis.

10 Claims, 3 Drawing Sheets

DETECTION SIGNAL

MEASURING DEVICE WITH AN INTEGRATED LIGHT SCANNING MEANS WHICH SCANS BOTH ROTATIONS OF A ROTATING BODY AND CODED DATA ASSOCIATED WITH THE ROTATING BODY

BACKGROUND OF THE INVENTION

The present invention relates to a measuring device with an integrated light scanning means for detecting the number of revolutions of a rotating member.

It is known from U.S. Pat. No. 5,059,901 to use a laser beam to scan reflection marks on rotating shafts in order to detect the number of revolutions of a rotating shaft.

In the maintenance of machine complexes, it is necessary to determine status data at a plurality of different measuring locations. This status data includes a number of physical parameters such as temperature, number of revolutions, oscillation strength, bearing conditions, cavitation etc. It is significant here for a later evaluation that the determined measurement data are associated with the respective measuring locations at which the measurement data was detected.

It is known for this purpose from U.S. Pat. No. 4,885,707 to equip a vibration measuring device for detecting the oscillation strength at machine bearings with a bar code reader which serves to read bar codes provided at the respective measuring locations for identification of the same.

SUMMARY OF THE INVENTION

It is an object of the present invention to provide a measuring device which can detect the number of revolutions of rotating members comprising an inexpensive and space-saving means for detecting measuring location identification data.

This object is solved in accordance with the invention in that the measuring device of the kind initially described is operable to detect contrast-coded data on a surface of a data carrier by means of the light beam scanning means.

The inventive measuring device includes a light beam scanning means which can be used to detect both the number of revolutions by means of reflections from a rotating body of a transmitted light beam and is also capable of being used to detect contrast-coded data, for example a bar code, which identifies the respective measuring location. The light beam scanning means of the measuring device according to the present invention thus fulfills two functions: on the one hand, it serves to detect the number of revolutions by means of reflection and, on the other hand, to determine measuring location identification data. The electronic and optical components of the light beam scanning means are necessary and provided only once for both detection of number of revolutions and detection of measuring location identification data so that the inventive measuring device is inexpensive and robust and, additionally, can be realized in small dimensions.

Advantageous exemplary embodiments of the present invention are defined in the dependent claims.

BRIEF DESCRIPTION OF THE DRAWINGS

In the following, exemplary embodiments of the present invention will be described with reference to the enclosed drawings, in which.

DETAILED DESCRIPTION OF THE PREFERRED EMBODIMENTS

Figure 1:
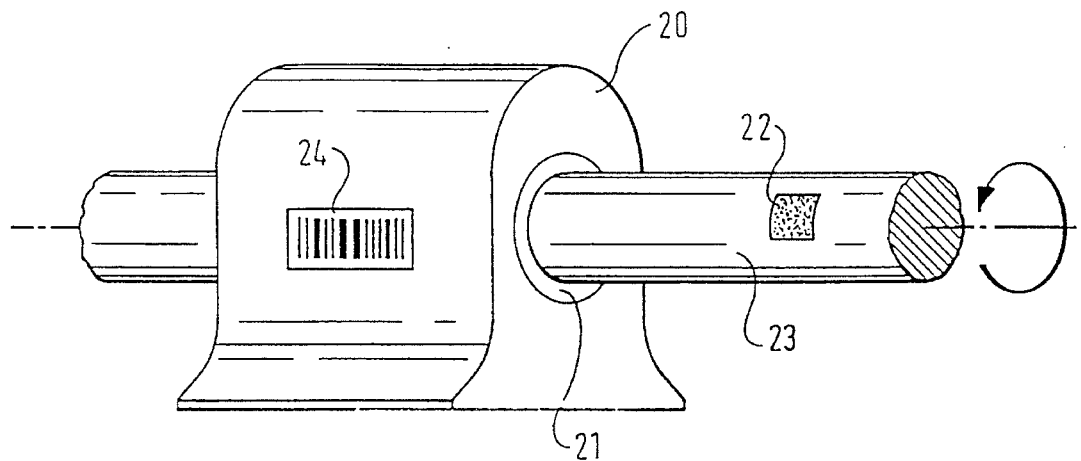
FIG. 1 shows an example of a measuring location.

FIG. 1 shows an example of a measuring location at which data are to be determined for a number of machine conditions. In this example, the status data of a roller bearing 21 in a bearing block 20 which supports a rotating shaft 23 is to be determined. The rotating shaft 23 has a reflection mark 22 which is used for measuring the number of revolutions. The bearing block 20 is provided with a measuring location identification means 24 in the form of a bar code.

The light beam scanning means of the inventive measuring device reads the bar codes, in this manner determines the measuring location identification data, and uses the same light beam scanning means to then determine the number of revolutions of the rotating shaft 23 according to the reflection principle. In order to determine the measuring location identification data, the measuring device is placed with the light beam scanning means onto the surface of the bar code 24 and moved manually transversally to the direction of extension of the code bars.

In order to determine the number of revolutions, the measuring device is held at a distance from the rotating shaft so that the light beam scanning means illuminates the rotating reflection mark 22 when this is located at the side of the shaft 23 facing the measuring device.

Depending on requirements, further measurements such as for temperature, oscillations strengths etc. can be carried out at the measuring location, here the bearing block 20.

Figure 2:
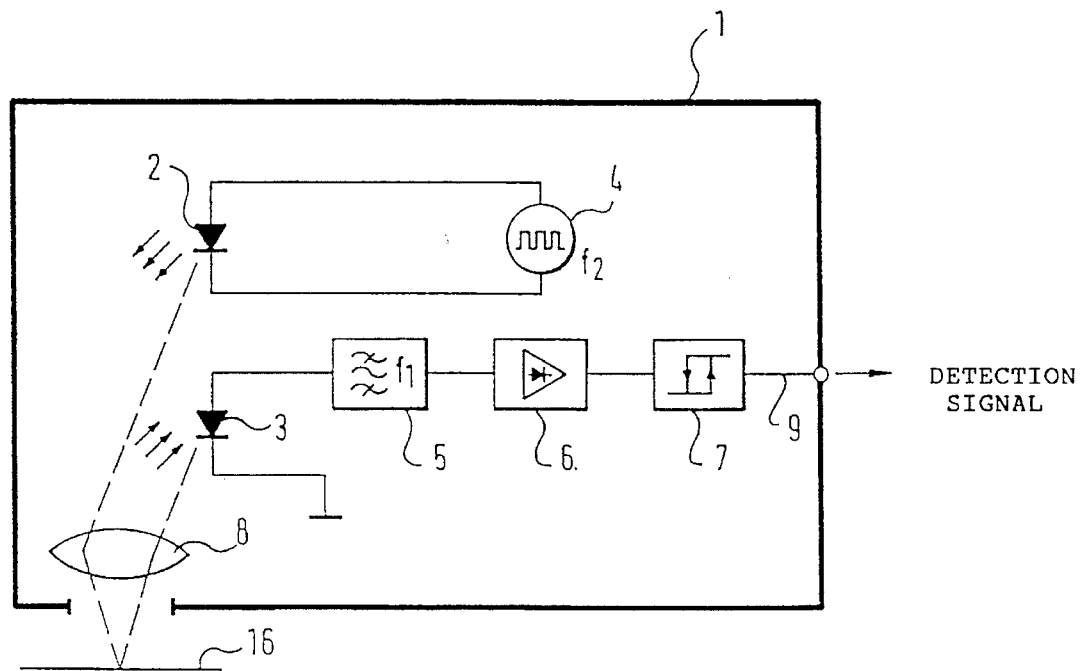
FIG. 2 shows a first exemplary embodiment of the present invention.

FIG. 2 shows an exemplary embodiment of a light beam scanning means in the manner in which it can be used in a measuring device according to the present invention. The light beam scanning means 1 includes a laser diode 2 which is driven by a pulse voltage source 4 so that the laser diode 2 emits light pulses at a high frequency $f_2$ in the range of several tens to several 100 kHz. The light emitted from the laser diode 2 passes through optical apparatus 8 such as lenses which direct the light onto a surface 16, in accordance with the invention either the surface of a rotating shaft or a bar code. The reflected light passes through optical apparatus which can be the same as those through which the emitted light passes and strikes a photodiode 3 which transforms the received light into electrical signals. The electrical signals from the photodiode 3 are band-pass filtered to exclude disturbing influences from foreign light, the transmission frequency of the band-pass 5 being determined according to the pulsing frequency of the supply circuit 4 of the laser diode 2. The output signal of the band-pass 5 is amplified in a signal processing means 6, rectified and filtered and then supplied to the input of a threshold circuit 7. A detection signal is provided at the output 9 of this threshold circuit 7 which corresponds optically to the surface of the detected contrast sequence.

Figure 3:
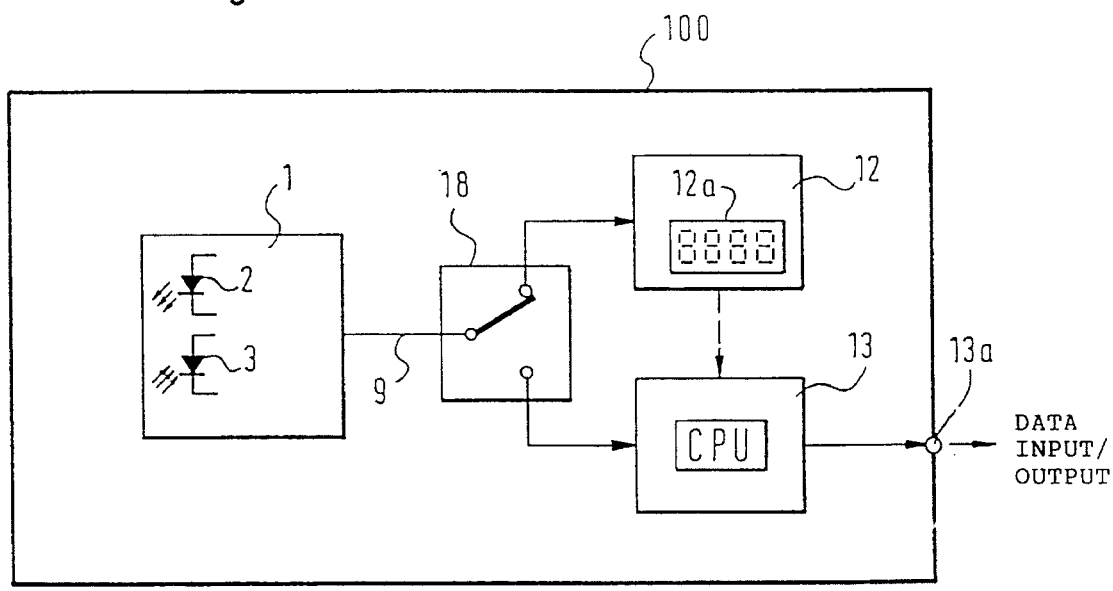
FIG. 3 shows an exemplary embodiment of a light beam scanning means.

FIG. 3 shows a first exemplary embodiment of the measuring device according to the invention. The measuring device 100 includes a light beam scanning means 1, a number of revolutions measuring means 12 with a display means 12a as well as a data detecting means 13 with a microprocessor CPU. 13a denotes an interface by means of which detected data can be read for evaluation.

The measuring device 100 according to the first exemplary embodiment of the invention also includes a selecting means 18 in the form of a switch which is equipped to be actuatable by an operator. The selecting means 18 serves to determine the mode of operation of the measuring device 100 to the extent whether the light beam scanning means 1 is being operated to measure the number of revolutions (drawn position of the switch) or whether the light beam detecting means 1 is being operated to detect bar code data.

In the mode of operation for measuring the number of revolutions, the revolutions measuring means 12 receives from the light beam scanning means 1 the detection signal outputted by this via the line 9, analyzes this and indicates the analysis result in the form of a number of revolutions via the display means 12a. For example, the display means 12a is a liquid crystal display. The number of revolutions measuring means 12 additionally transmits the analysis result to the data detecting means 13 which stores the determined number of revolutions.

If the mode of operation for detecting data is selected by means of the selecting means 18, the detection signal at the output 9 of the light beam scanning means 1 goes via the selection means 18 to a detection signal input of the data detecting means 13. The data detecting means analyzes the detection signal received from the light beam scanning means 1 and carries out appropriate decoding steps in order to retrieve bar-coded data which was read by means of the scanning means 1.

The data detecting means 13 associates the detected data which identify the measuring location with the measured status data of the measuring location and stores this data. The data detecting means 13 can be designed such that it recommends the next step of the measuring process to the operator in dependence on how far the measurement process has advanced. Such a progress control is carried out by means of the microprocessor unit CPU in the data detecting means 13 according to programmed data which the data detecting means receives via the interface means 13a. If the data detecting means 13 recognizes the presence of measurement data, but not yet the corresponding measuring location identification data, the data detecting means 13 outputs an optical or acoustic signal which signals to the operator that the measuring location identification data detection is still to be carried out.

Figure 4:
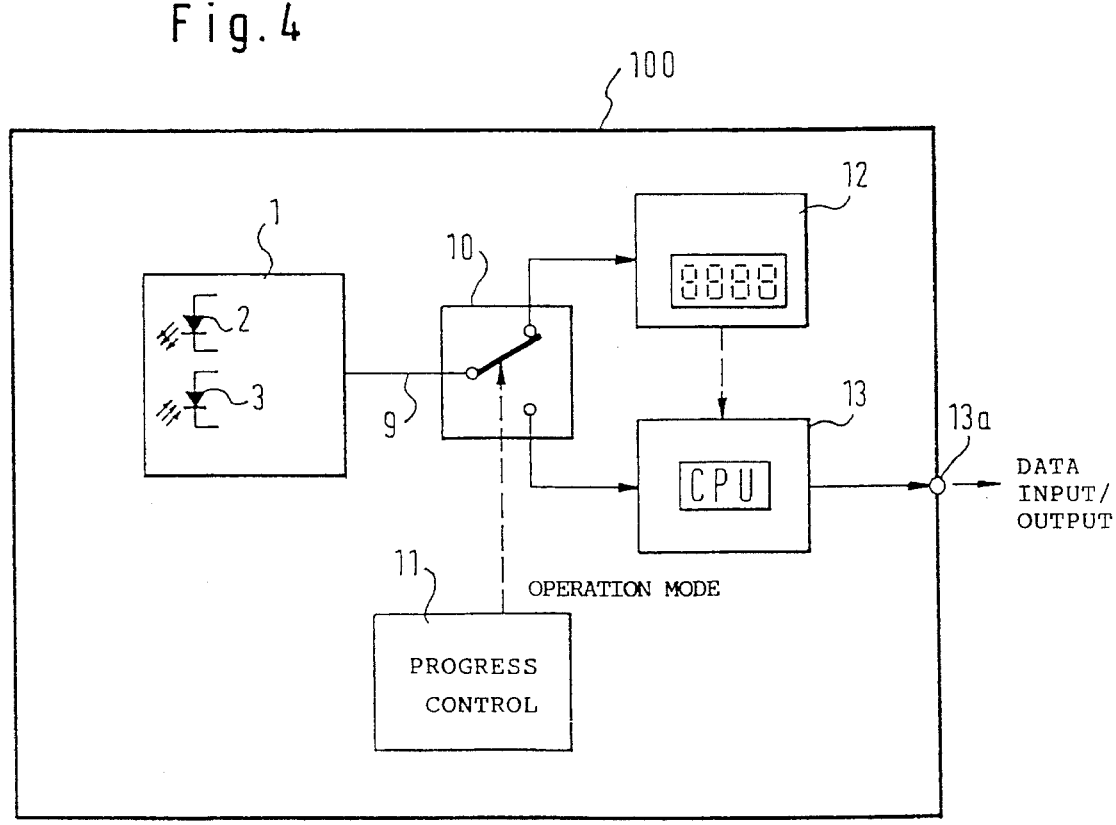
FIG. 4 shows a second exemplary embodiment of the inventive measuring device.

FIG. 4 shows a second exemplary embodiment of the measuring device 100 according to the invention. In addition to the light beam scanning means 1, the number of revolutions measuring means 12 and the data detecting means 13, the measuring device according to this exemplary embodiment includes a progress control means 11 which controls a mode of operation switching means 10. In FIG. 4, the progress control means 11 is represented as a functionally independent means. However, its operation can be realized by means of the microprocessor in the data detecting means 13. The progress control means 11 is programmable via the interface 13a to sequentially configure the measuring device according to this exemplary embodiment according to the measurements to be carried out at a specific measuring location. At the beginning of measurement data detection at a specific measuring location, the progress control 11 places the measuring device by way of the switching means 10 in the mode of operation for detecting data and issues an optical or acoustic signal to the operator to read in the measuring location identification data into the data detecting means 13 by means of the light beam scanning means 1. The data detecting means 13 includes a list of the measurement values to be determined for each measuring location. In accordance with this list, the progress control 11 now configures the measuring device for each individual measurement and signals to the operator by way of a display means which measurement value is next to be detected. Following successful determination of the measurement value, the progress control 11 moves to the next measurement value to be determined at this measuring location.

If the measurement value to be determined is the number of revolutions, the progress control 11 places the measuring device 100 by way of the switching means 10 into the mode of operation for measuring the number of revolutions in which the detection signal delivered by the light beam scanning means 1 is then processed in the same manner as in the previous exemplary embodiment. After completion of all measurements required at the respective measuring location, the progress control 11 then issues an instruction of an optical or acoustic kind to the operator to read in the measuring location identification data of the next measuring location by means of the light beam scanning means 1.

Figure 5:
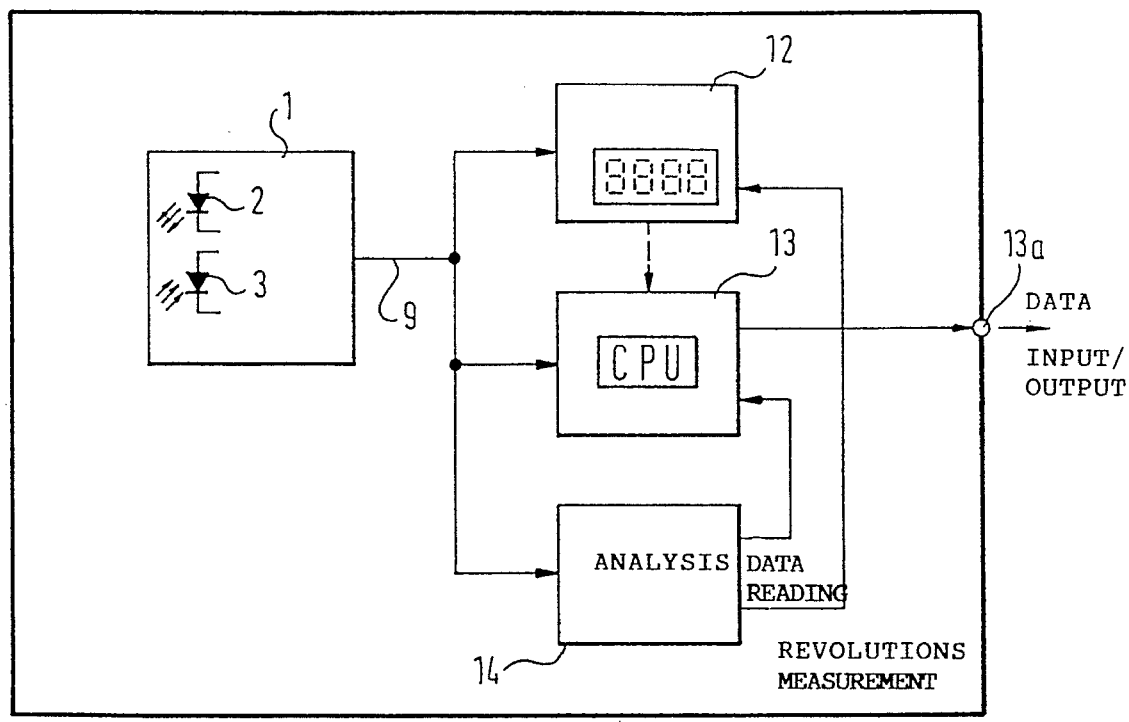
FIG. 5 shows a third exemplary embodiment of the inventive measuring device.

FIG. 5 shows a third exemplary embodiment of a measuring device according to the present invention. In addition to the light beam scanning means 1, the number of revolutions measuring means 12 and the data detecting means 13 this exemplary embodiment includes an analyzing means 14 which, like the revolutions measuring means 12 and the data detecting means 13, receives the detection signal as an input signal from the output line 9 of the light beam scanning means 1. The analyzing means 14 analyzes the detected signal from the scanning means 1 and, in dependence on the result of the analysis, selects one of the modes of operation consisting of the number of revolutions measurement and the data detection. Based on the selected number of revolutions, the analyzing means 14 transmits activating signals to the revolutions measuring means 12 or to the data detecting means 13. For selection of the mode of operation, the analyzing means 14 makes use of the fact that the detection signal of the light beam scanning means 1 has different properties when the number of rotations is being measured than in the case in which measuring location identification data are being read with the light beam scanning means.

Figure 6A:
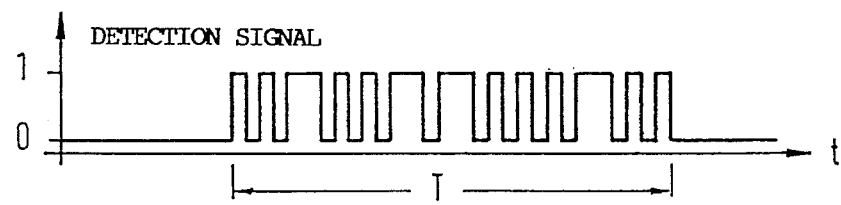
FIG. 6a, 6b show examples of a detection signal.

FIG. 6A shows an example of a detection signal which occurs at the output 9 of the light beam scanning means 1 when this is used to read a bar code.

Figure 6B:
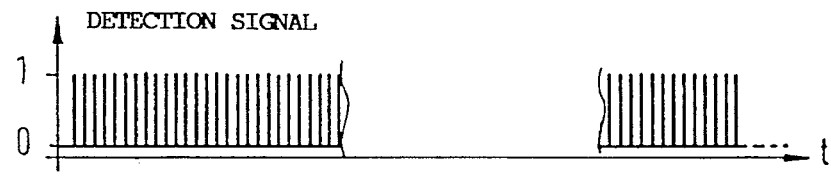

In comparison to this, FIG. 6B shows an example of a detection signal at the output 9 of the light beam scanning means 1 when this is used to measure the number of revolutions.

In accordance with a first exemplary embodiment of the analyzing means 14 according to the third exemplary embodiment of an inventive measuring device, the analyzing means 14 determines the time duration T of the detection signal. If the duration of the detection signal extends over a longer time period than a predetermined time period $T_0$, the analyzing means 14 determines that the light beam scanning means 1 is currently measuring the number of revolutions and accordingly activates the revolutions measuring means 12 and deactivates the data detecting means 13.

On the other hand, if the analyzing means 14 determines that the detection signal has a time duration T which is shorter than the predetermined time duration, the analyzing means 14 decides that the light beam scanning means 1 is currently being used for data detection, deactivates the revolutions measuring means 12 and activates the data detecting means 13.

According to a second exemplary embodiment of the analyzing means 14 according to the third exemplary embodiment of an inventive measuring device, the analyzing means 14 analyzes the detection signal at the output 9 of the light beam scanning means 1 for whether this has an essentially periodic structure. For example, such an analysis can be carried out with digital means by way of an FFT (Fast Fourier Transformation) for a predetermined time period of the detection signal, measured from the beginning of the detection signal. If the detection signal has a substantially periodic structure, the analyzing means 14 decides that the light beam scanning means 1 is currently detecting a number of revolutions and supplies the detection signal to the revolutions measuring means 12 or activates this and deactivates the data detecting means 13. On the other hand, if the analysis results in that the detection signal 9 is not essentially periodic in the time interval used for the analysis, the analyzing means 14 passes the detection signal determined in the analysis period to the data detecting means 13, activates this and deactivates the revolutions measuring means 12. The data detecting means 13 then decodes the detection signal, stores the detected data or possibly generates an error message which indicates that the detection signal does not correspond to a bar code.

According to a third exemplary embodiment of the analyzing means 14, this bases the decision whether the light beam scanning means 1 is currently being used for measuring the number of revolutions or for data detection on whether the detection signal has high frequency parts or not. This exemplary embodiment is particularly suitable when high numbers of revolutions are to be measured. If it is determined by the analyzing means 14 according to this exemplary embodiment that the basic frequency of the detection signal lies above a predetermined threshold, then this recognizes that a number of revolutions is currently being measured by the light beam scanning means 1 and accordingly activates the revolutions measuring means 12 and deactivates the data detecting means 13. In a corresponding manner, the analyzing means 14 selects the mode of operation for data detection when the basic frequency of the detection signal lies beneath the predetermined threshold.

According to a fourth exemplary-embodiment of the analyzing means 14, this bases the decision whether a number of revolutions is currently being measured or data is being detected by means of the light beam scanning means 1 on a combination of the criteria described in the preceding exemplary embodiments of the analyzing means 14. For example, the analyzing means 14 decides from the analysis of the detection signal that the light beam scanning means 1 is currently detecting data when the duration of the detection signal is shorter than a predetermined time duration and the detection signal has structures which are predominantly not periodic. By suitable combination of different criteria, the error rate of the analyzing result can be reduced in dependence on the requirements of practice. Additionally, it is possible by means of a combination of different criteria that the analyzing means 14 recognizes that the detection signal outputted by the light beam scanning means 1 is neither a revolutions measuring signal nor a data detecting signal when the detection signal at the output 9 of the scanning means 1 does not fulfill all the required criteria for a revolutions measuring signal or for a data detecting signal.

I claim:

1. A measuring device, comprising:

an integrated light beam scanning means for scanning both a rotating body and contrast coded data on a surface of a data carrier; and means for detecting the number of revolutions of the rotating body and for detecting said contrast-coded data on a surface of the data carrier (24) based on detection signals outputted from the light beam scanning means.

2. A measuring device according to claim 1, wherein said mean for detecting includes a first signal processing means (12) for transforming the detection signals outputted by the light beam scanning means into a number of revolutions value; and a second signal processing means (13) for transforming the detection signals outputted by the light beam scanning means into output data.

3. A measuring device according to claim 1, further including a selecting means (18) which is actuatable by an operator in order to select between modes of operation of the means for detecting, said modes including measuring the number of revolutions and detecting data.

4. A measuring device according to claim 1, further including an analyzing means (14) which analyzes signals outputted by the light beam scanning means (1), and based on the result of the analysis, automatically selects between modes of operation of the means for detecting, said modes including measuring the number of revolutions and detecting data.

5. A measuring device according to claim 4, wherein the analyzing means (14) selects the mode of operation of detecting data when the detection signal (9) outputted by the light beam scanning means lasts for a shorter time than a predetermined time duration ($T_o$) and selects the mode of operation of measuring the number of revolutions when the detection signal outputted by the light beam scanning means lasts longer than the predetermined time duration ($T_o$).

6. A measuring device according to claim 4, wherein the analyzing means (14) is selects the mode of operation of measuring the number of revolutions when the detection signal outputted by the light beam scanning means has a predominantly periodic structure and selects the mode of operation of detecting data when the detection signal has a predominantly aperiodic structure.

7. A measuring device according to claim 4, wherein the analyzing means (14) selects the mode of operation of measuring the number of revolutions when the frequency of the detection signal outputted by the light beam scanning means is high and selects the mode of operation of data detection when the frequency of the detection signal is low.

8. A measuring device according to claim 6, wherein the analyzing means (14) selects the respective mode of operation depending on the duration and on the periodicity of the detection signal and/or the frequency of the detection signal.

9. A measuring device according to claim 1, wherein the light beam scanning means includes a laser beam generating means (2).

10. A measuring device according to claim 1, wherein the light beam scanning means reads bar codes (24) which identify a measuring location.

* * * * *

UNITED STATES PATENT AND TRADEMARK OFFICE
CERTIFICATE OF CORRECTION

PATENT NO. : 5,612,544
DATED : March 18, 1997
INVENTOR(S) : DIETER BUSCH

It is certified that error appears in the above-identified patent and that said Letters Patent is hereby corrected as shown below:

COLUMN 3
    Lines 32 through 35 should remain as one whole paragraph; and
    line 36 should begin a new paragraph.

COLUMN 5
    Line 19, "On" should read --On--; and
    line 47, "exemplary-embodiment" should read --exemplary embodiment--.

COLUMN 6
    Line 14, "mean" should read --means--; and
    line 42, delete "is".

Signed and Sealed this

Eleventh Day of November, 1997

Attest:

BRUCE LEHMAN

Attesting Officer     Commissioner of Patents and Trademarks